US012632054B1

(12) United States Patent
Singh et al.

(10) Patent No.: US 12,632,054 B1
(45) Date of Patent: May 19, 2026

(54) TECHNIQUES TO DETERMINE REGION ROUTE GUIDING POINTS USING CONVERGENCE CIRCLES

(71) Applicant: Amazon Technologies, Inc., Seattle, WA (US)

(72) Inventors: Bijendra Singh, Cedar Park, TX (US); Anoop Aroor, Boston, MA (US); William Cathey Diederich, Brighton, MA (US); Annaleah Ernst, Kenai, AK (US)

(73) Assignee: Amazon Technologies, Inc., Seattle, WA (US)

( * ) Notice: Subject to any disclaimer, the term of this patent is extended or adjusted under 35 U.S.C. 154(b) by 554 days.

(21) Appl. No.: 17/893,062

(22) Filed: Aug. 22, 2022

(51) Int. Cl.
*G05D 1/00* (2024.01)
*G01C 21/36* (2006.01)

(52) U.S. Cl.
CPC ....... *G05D 1/0231* (2013.01); *G01C 21/3623* (2013.01); *G05D 1/0276* (2013.01)

(58) Field of Classification Search
CPC . G05D 1/0231; G05D 1/0276; G01C 21/3623
USPC .......................................................... 701/24
See application file for complete search history.

(56) References Cited

U.S. PATENT DOCUMENTS

| | | | | |
|---|---|---|---|---|
| 8,576,235 | B1 * | 11/2013 | Sumner ............... | A63F 13/5258 |
| | | | | 345/473 |
| 9,446,855 | B2 * | 9/2016 | Canale ................. | G05D 1/0676 |
| 2017/0132839 | A1 * | 5/2017 | Ambrus ............. | G02B 27/0172 |
| 2018/0100743 | A1 * | 4/2018 | Diaz ................. | G01C 21/3415 |

* cited by examiner

*Primary Examiner* — Helal A Algahaim
*Assistant Examiner* — John D Holman
(74) *Attorney, Agent, or Firm* — Kilpatrick Townsend & Stockton LLP

(57) ABSTRACT

Techniques for generating a route for a computer-guided vehicle are disclosed. A server device can receive a graph with an ordered connection of regions of a map of a space. The computer system can determine a start point and an end point in the graph that define a subset of the points in the graph. The computer system can then generate, using the graph, a route by designating a current guide point, determining a convergence radius for each point in the subset of the points, and evaluating a visibility criterion between the current guide point and the subset of the points. Based on a point failing the visibility criterion, the computer system can designate an additional point that passed the visibility criterion as the current guide point, add the current guide point to the route, and iterate until both the start point and the end point are in the route.

20 Claims, 13 Drawing Sheets

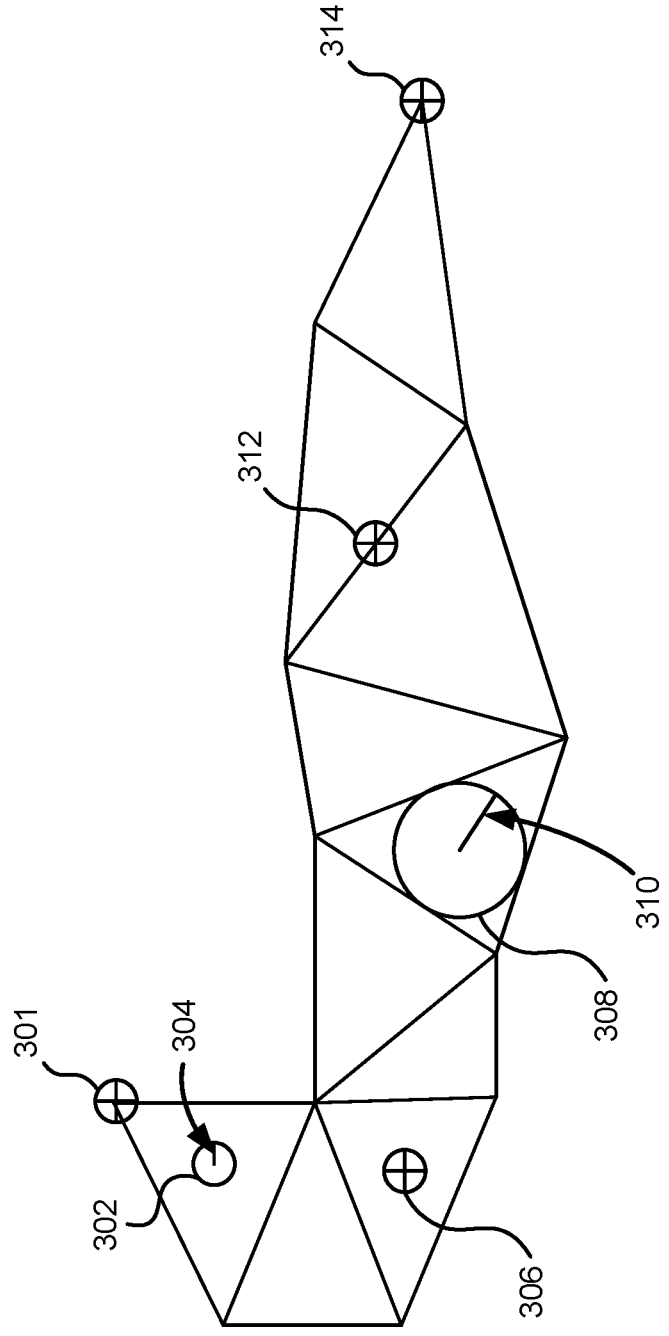
FIG. 3

400

402

404

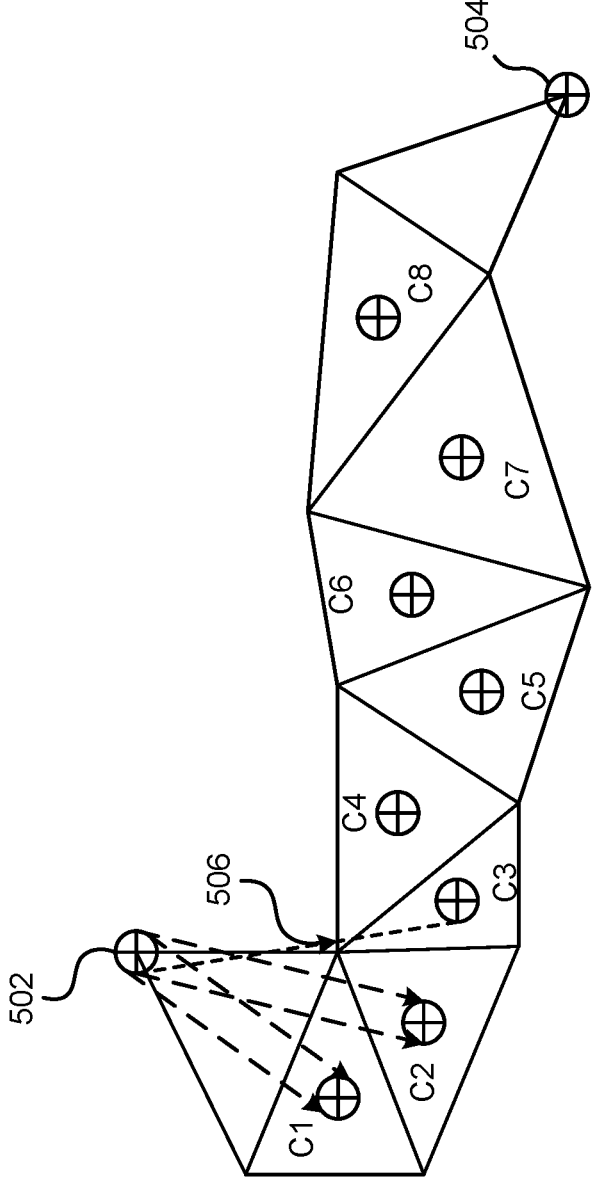
FIG. 5

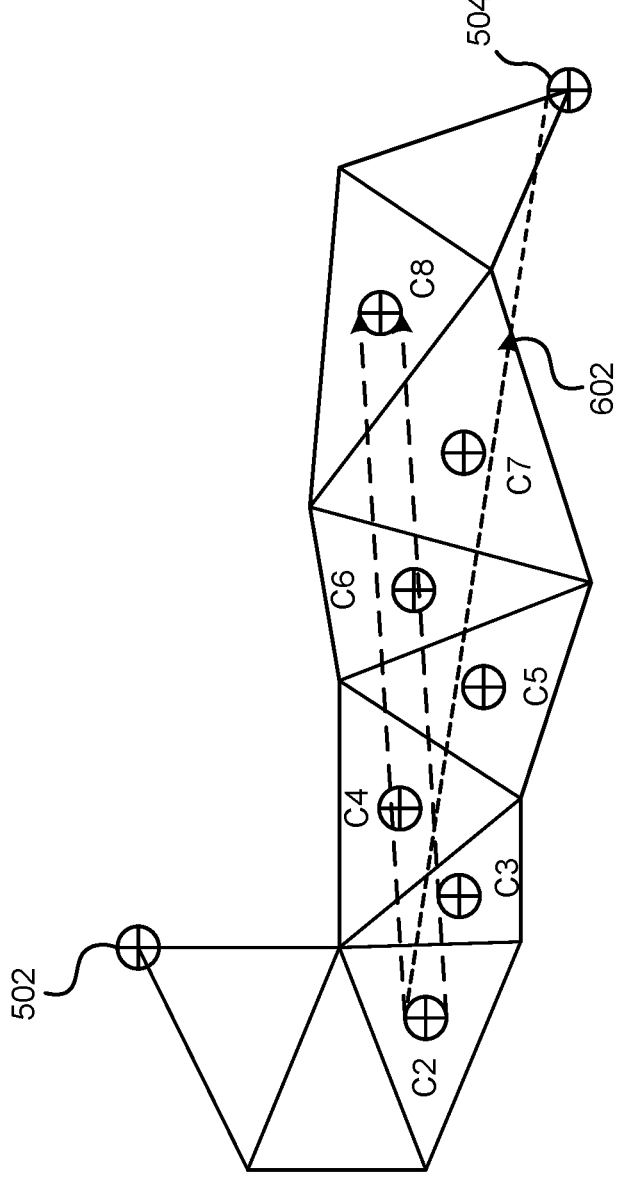
FIG. 6

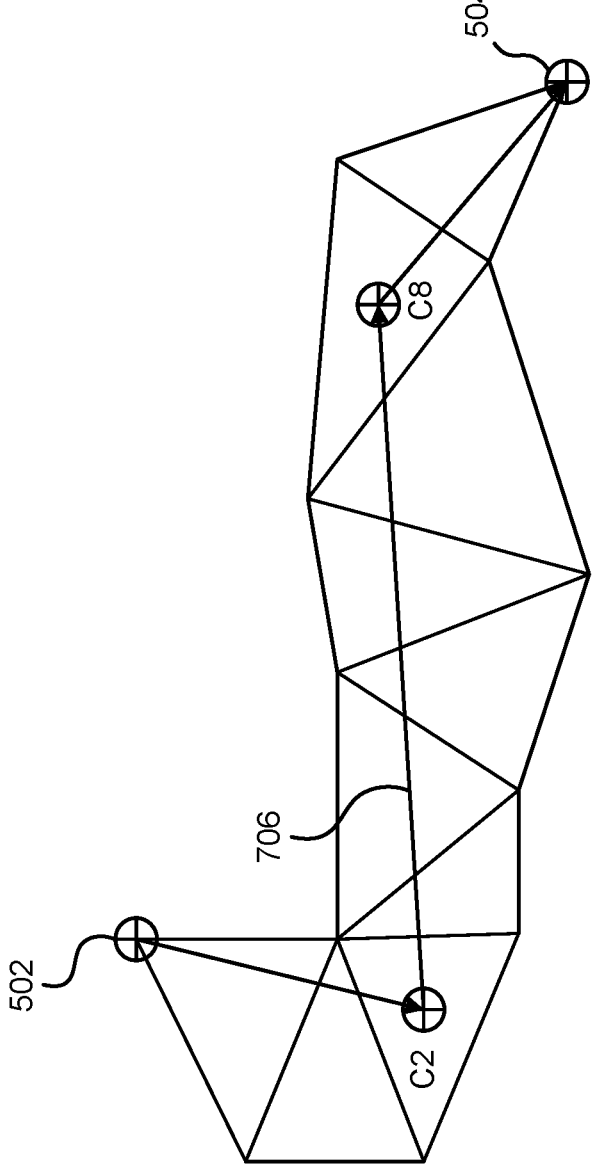
FIG. 7

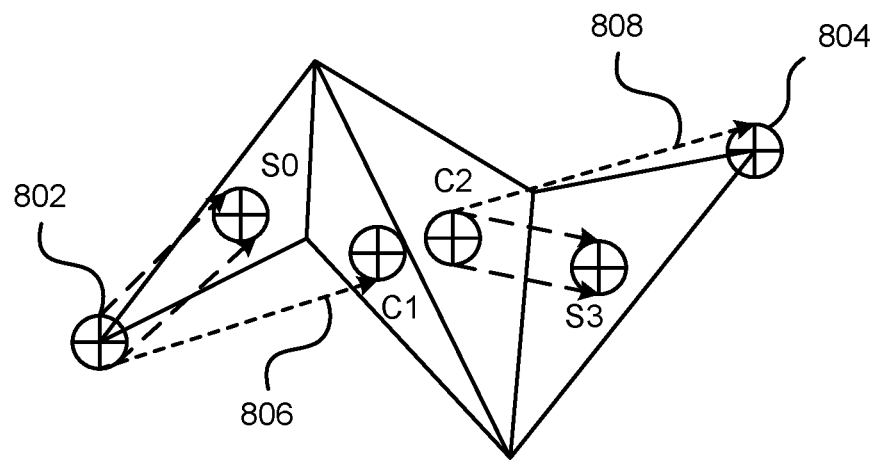
FIG. 8

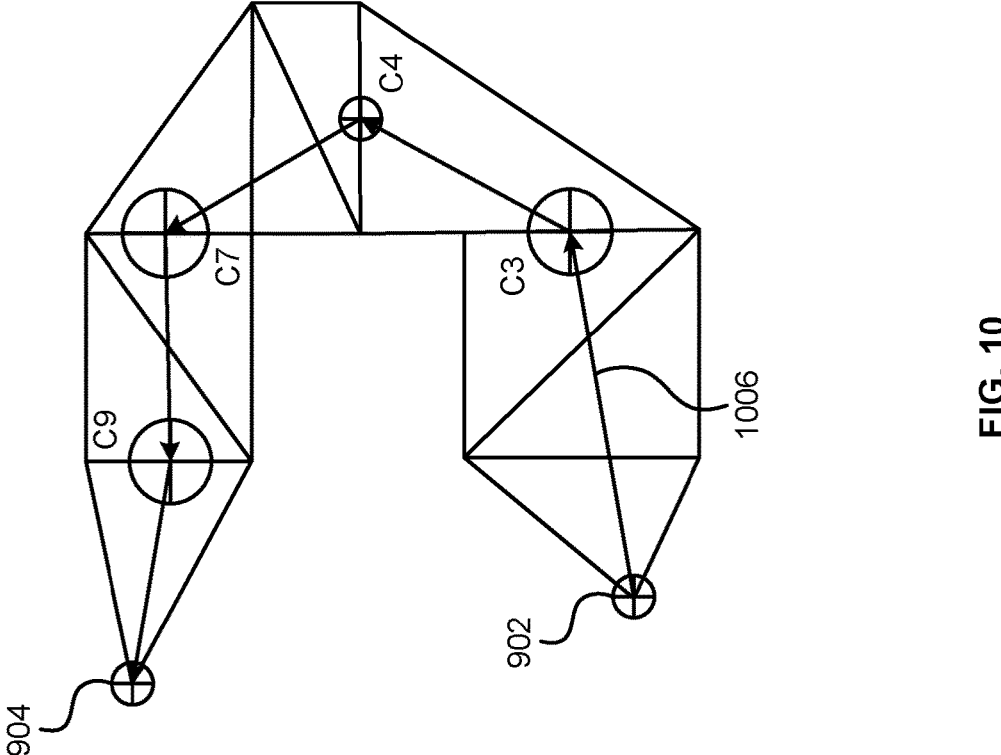
FIG. 10

1200

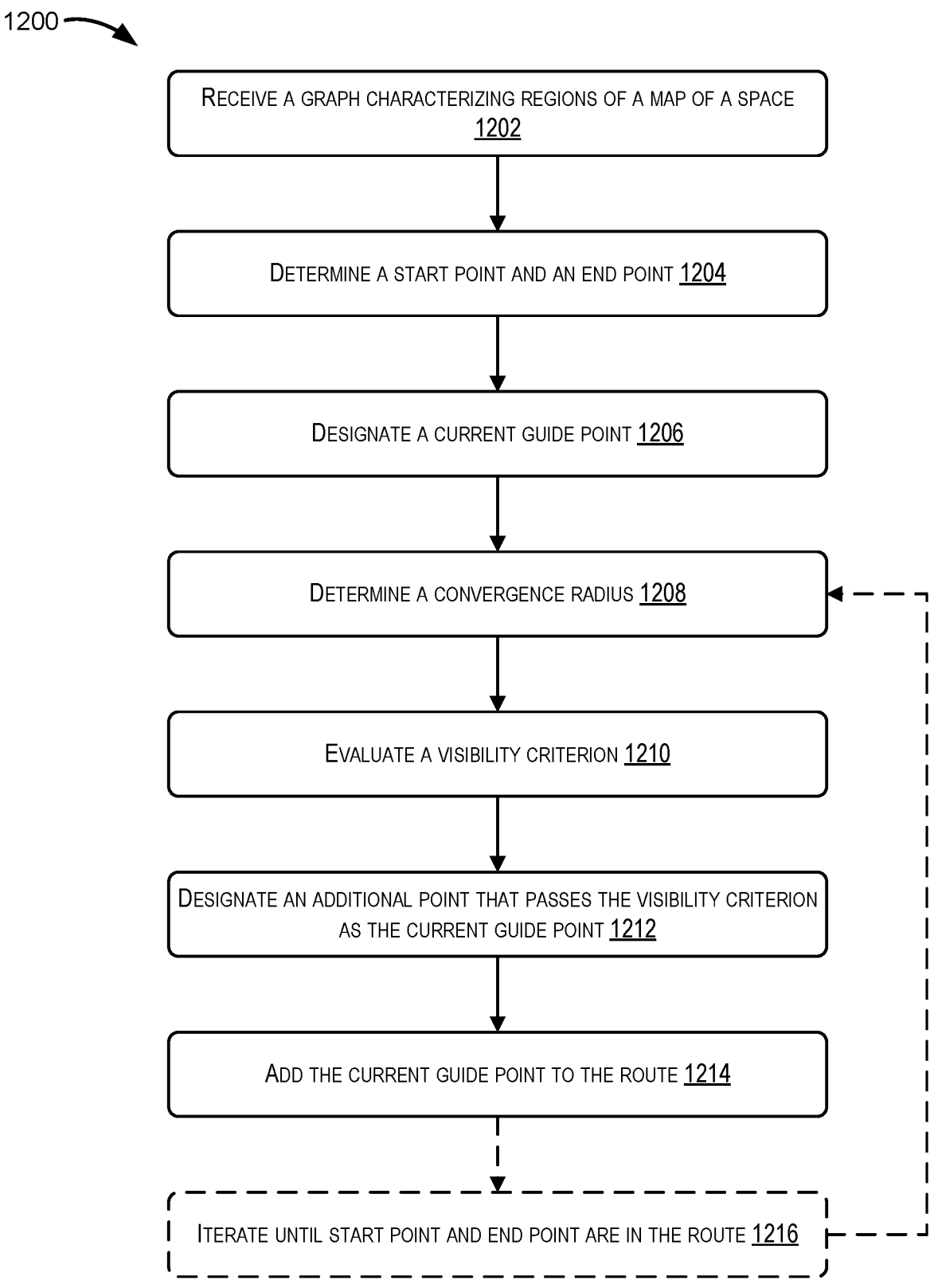

RECEIVE A GRAPH CHARACTERIZING REGIONS OF A MAP OF A SPACE 1202

DETERMINE A START POINT AND AN END POINT 1204

DESIGNATE A CURRENT GUIDE POINT 1206

DETERMINE A CONVERGENCE RADIUS 1208

EVALUATE A VISIBILITY CRITERION 1210

DESIGNATE AN ADDITIONAL POINT THAT PASSES THE VISIBILITY CRITERION AS THE CURRENT GUIDE POINT 1212

ADD THE CURRENT GUIDE POINT TO THE ROUTE 1214

ITERATE UNTIL START POINT AND END POINT ARE IN THE ROUTE 1216

FIG. 12

TECHNIQUES TO DETERMINE REGION ROUTE GUIDING POINTS USING CONVERGENCE CIRCLES

BACKGROUND

Robots and other guided vehicles can use pathfinding and route finding techniques to navigate through various spaces. Navigation through the spaces may rely on sensors, computer vision, and other guidance input for the robots to locate the robots in the space. The spaces can include warehouses, production facilities, public sidewalks, and other locations that have a variety of terrain, obstacles, people, and other robots posing a challenge to accurate and efficient navigation.

BRIEF DESCRIPTION OF THE DRAWINGS

Various embodiments in accordance with the present disclosure will be described with reference to the drawings, in which:

FIG. 3 is a diagram illustrating a portion of a graph of a space with example guide points and convergence radii, according to some embodiments.

FIG. 5 is a diagram illustrating a technique for determining guide points of a route through a space from a start point to an end point, according to some embodiments.

FIG. 6 is a diagram illustrating additional techniques for determining guide points of a route through a space, according to some embodiments.

FIG. 7 is a diagram illustrating a complete route with multiple guide points, according to some embodiments.

FIG. 8 is diagram illustrating a technique for adding supplemental guide points to regions of a graph, according to some embodiments.

FIG. 10 is another diagram illustrating a complete route with multiple guide points having different convergence radii, according to some embodiments

FIG. 12 is a simplified flow diagram of an example process for generating a route through a space, according to some embodiments.

DETAILED DESCRIPTION

Figure 1:
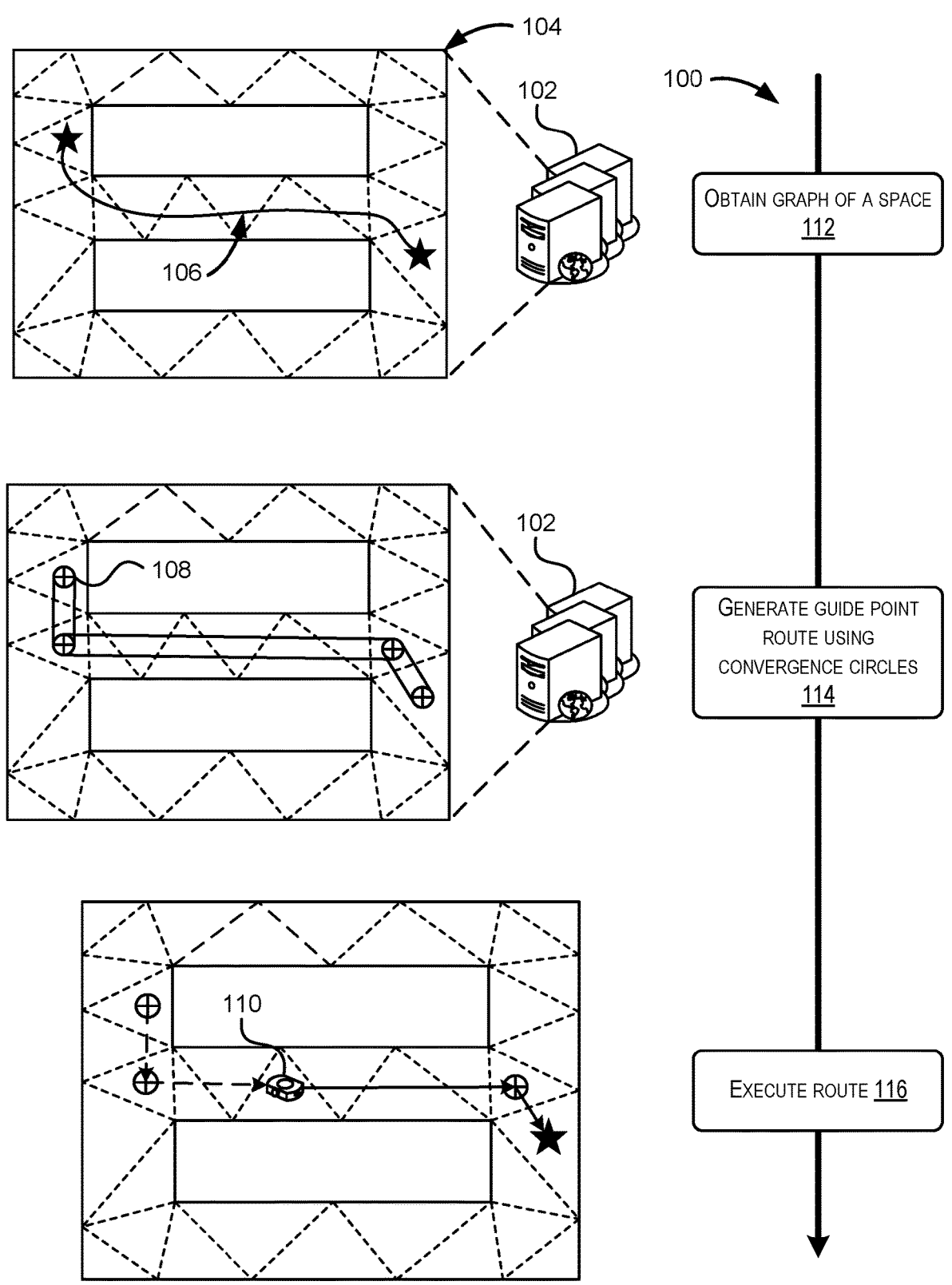
FIG. 1 is a simplified block diagram and associated flow chart of an example process to generate a route using convergence circles, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include systems, methods, and computer-readable media for determining routes through spaces that can be navigated by robots or other guided vehicles. A route can be a collection of points (e.g., way points) that a robot can use to navigate in sequence to move along the route. Because a robot relies on various sensors (e.g., to track its location, to avoid obstacles during navigation, etc.), the robot is capable of autonomous movement through the space using the way points to guide the overall navigation. However, errors in the robot's position may result in an inability to strictly follow a sequence of way points.

To compute a route, a computer system can receive a graph characterizing a map of a space. The map can be, for example, a floorplan of a facility, a site map, or other similar representation of the dimensions of a space navigable by a robot. The map can be divided into smaller regions (e.g., triangles, polygons, etc.) using triangulation or a similar regionalization process to create an unstructured grid of the map. The graph can then be an ordered sequence of the smaller regions (e.g., "points" of the graph) that produce a path from a starting position on the map to an end position on the map. For example, the floor of a warehouse may be divided into smaller triangular regions and a graph could represent a sequence of those triangular regions from an item location (e.g., a shelf in the warehouse) to an item destination (e.g., a pallet receptacle), such that the graph represents a path for a robot to retrieve an item pallet from the shelf and place it at the destination pallet receptacle. The points corresponding to the smaller regions may be centroids of the regions, vertices of the regions, centers of adjacent edges of the regions, or other similar points.

Using the graph, the computer system can determine a route from the start point of the graph to the end point of the graph by evaluating a visibility criterion for each point in the graph to subsequent points in the graph. However, instead of treating each graph point as a dimensionless object, embodiments of the present disclosure may assign each point a radius (e.g., convergence radius) so that the "points" in the graph are evaluated as circles centered at the points. The radius can be determined based on location error of the robots' navigation system, the dimensions of the robots, the dimensions of the regions of the map, or other characteristic physical constraints of the movement through the space. A first guide point may be visible from a second guide point in the graph if one or more points of the convergence circle of the first guide point are "visible" from one or more points of the convergence circle of the second guide point. Visibility can include an unobstructed path between the evaluation points with respect to a sensor system of the robot. For example, the robot may navigate using light detection and ranging (LIDAR), so that a guide point (guide point convergence circle) may be visible if there is an unobstructed straight line optical path from another guide point (guide point convergence circle). As used herein, the term "guide point" may refer to both the point and the corresponding guide point convergence circle centered at that point.

The computer system may evaluate the visibility of each successive guide point in the graph from a current guide point (e.g., the start point) until determining a guide point that fails the visibility criterion. The computer system may then add the immediately prior guide point (e.g., that passed the visibility criterion) to the route and treat this guide point as the new current guide point. The computer system can then iterate by evaluating the visibility from the current guide point to the remaining subsequent points in the graph, until the end point is reached. In doing so, a route along the graph is generated that typically includes fewer guide points than in the full graph, with each guide point having a convergence radius. A robot following this route can successfully reach each guide point if the robot determines that its location is within the convergence radius.

To illustrate the above technique, consider a warehouse with rows of pallets with open floor space in between and around the sides of the pallets. A robot in the warehouse may be a wheeled vehicle capable of fitting under a pallet and lifting and maneuvering the pallet. The robot may need to navigate from one end of an aisle (e.g., a start point) between item pallets, down the aisle, and around the end of the adjacent row of pallets to a drop location (e.g., an end point) to complete a task. The robot may be in communication with a computer system (e.g., a cloud server) that can generate a route for the robot. The computer system can obtain a graph for a path between the start and end points. A map of the floor of the warehouse may be divided into a number of triangles. From the start point, the graph may connect the triangles down the aisle and around to the end point. To generate the route, beginning from the start point, the computer system can determine a convergence radius for each successive triangle's guide point, determine whether the resulting convergence circle is visible from the previous guide point, and if not, add the last visible guide point to the route and iterate. The resulting route can have a first guide point near the end of the aisle (since that guide point may be the last visible guide point from the start), a subsequent guide point around the end of the row, and a final guide point coincident with the end point.

Embodiments of the present disclosure provide numerous technical advantages over conventional route finding and route generating techniques. Because robots and other guided vehicles may have location error with respect to their identified location relative to their true location, a robot navigating a conventional route with way points may erroneously "reach" a way point without physically arriving at the correct location. When attempting to locate the next way point, the location error can result in the next way point not being visible from the robot's actual location, creating an exception in the navigation routine of the robot. Routes with guide points having convergence radii can allow a robot or other vehicle to navigate to a guide point and guarantee that the robot can see the next guide point even if the robot does not reach the exact center of the convergence circle due to location error. This can result in fewer failed routes and fewer requests from the robot to a computer system for a re-computed route or other exception handling, improving the performance of both the robotic system and the route generating computer system.

Moreover, a typical route may enforce a shortest distance for the robot to travel, which can result in a path that brings the robot close to physical obstacles (e.g., walls) and other obstructions. A robot may slow to maneuver in proximity to such obstructions (to avoid collisions) as well as require sharp and relatively slow turns around corners. Guide points with convergence radii can lead to routes that keep the robot further from walls and obstacles, thereby allowing the robot to maneuver more quickly and complete the full route faster even if the path is physically longer than a conventional "shortest distance" path.

Although the various embodiments of the disclosure that follow are described with respect to maps and navigation within a two dimensional space (e.g., triangulation of floorplans, site maps, etc.), the techniques described herein are also applicable to navigation within three dimensional space. For example, the robot may be an aerial vehicle such as a drone that can move through an enclosed or partially enclosed space. A map of the space can represent the dimensions of the three dimensional space (e.g., a 3D model), and a regionalization of the space can include various polytopes/polyhedrons (e.g., tetrahedrons) that divide the space and allow for the determination of graphs of connected regions. The guide points in the graph can have a convergence radii, creating a convergence sphere around the guide point for evaluating the visibility criterion between the guide points.

Turning now to the figures, FIG. 1 is a simplified block diagram and associated flow chart of an example process 100 to generate a route using convergence circles, according to some embodiments. The diagram shows features corresponding to blocks of the process 100. The process 100 can be performed by a computer system 102, which can include a server device, a user device, an on-board robotic computer system, or any suitable combination of computing devices. Additional details about computing systems that are capable of performing the techniques of the disclosure are provided below with respect to FIGS. 11 and 13. In some embodiments, the computer system can implement a route planning engine, which can be a collection of software applications, services, and/or other process configured to perform the techniques herein, including generating a route with guide points having convergence radii.

The process 100 can begin at block 112 with the computer system 102 obtaining a graph of a space. As depicted in FIG. 1, the space can be represented by a map 104, which can be a floorplan, site plan, or similar diagram. The map 104 may be represented as a data object or data structure in any suitable language that defines the characteristics (e.g., dimensions, layout, arrangement, etc.) of the map 104. For example, the map 104 may be represented as a drawing in a computer-aided design software program. As another example, the map 104 may be represented by a markup language such as geographic markup language (GML), IndoorGML, or the like.

The map 104 may be divided into triangles, polygons, or other geometrical regions. For example, the map 104 may represent a warehouse with two rows of shelves or other inaccessible space. The accessible regions of the map 104 are divided into several triangles. Triangulation (generally referred to herein as "regionalization") can be performed using known algorithms. For example, Delaunay triangulation may be used to divide the map 104 into triangles. In some embodiments, refinements (e.g., Delaunay refinement, Ruppert's algorithm, etc.) may be used to produce the smaller regions of the map 104. The division of the map 104 into triangles may form an unstructured field representing the space.

The graph may be a data object that imparts a connection or similar structure onto the triangulation of the map 104. For example, the graph may be an ordered connection of triangular regions between two points associated with different triangular regions on the map. As illustrated in FIG. 1, a path 106 between a start point and end point (represented as two "stars") may pass through a unique sequence of connected triangles. The ordered connection of triangles defined by the path 106 may constitute the graph. As with the triangulation, the graph may be generated by known graph search algorithms including A*, Dijkstra's algorithm, or the like. A map 104 may have multiple paths between a start point and an end point. The graph search algorithm may be configured to generate a graph having the fewest number of triangles between the start point and the end point (e.g., corresponding to a "shortest" route). Other optimizations of the graph are contemplated, including graphs that prefer larger, open spaces in the map 104, graphs that avoid narrow spaces or spaces that are similar in size to the dimensions of the robot, and so on.

In some embodiments, the computer system 102 may be configured to perform operations for the triangulation of the map 104 and/or generating the graph from the map 104. In other embodiments, another computer system may perform the triangulation and/or graph search operations and send the resulting graph to computer system 102.

At block 114, the computer system 102 can generate a route with guide points (e.g., guide point 108) that have convergence circles. The convergence circles can be characterized by a convergence radius. Each guide point may correspond to one of the triangles of the graph. For example, each triangle on the graph for path 106 can have a guide point at the centroid of the triangle. In some embodiments, the guide points can be located at a vertex of the corresponding triangle. In some embodiments, the guide points can be located at the center of a connecting edge of the corresponding triangle. Other embodiments may use guide points located at various combinations of these locations. Additional detail about guide points, guide point locations, convergence radii, and convergence circles is provided below with respect to FIG. 3.

Generating the route can include evaluating a visibility criterion. For example, starting from guide point 108, the computer system can evaluate whether the subsequent guide points are visible. When a subsequent guide point fails the visibility criterion (e.g., is not visible from the current guide point), the prior guide point that did pass the visibility criterion is added to the route and designated as the current guide point. The process can repeat until the guide point corresponding to the end point is added to the route. As illustrated in FIG. 1, a route may have fewer guide points (e.g., four) than points in the full graph (e.g., 11 triangles). Additional detail about evaluating visibility criteria is provided below with respect to FIGS. 4A-10.

At block 116, a robot 110 can execute the route. The computer system 102 can send the route to the robot 110. The robot 110 may be in communication with the computer system 102 and configured to send and receive data via one or more networks (e.g., a Wi-Fi network, a cellular network, etc.). In some embodiments, the robot 110 may be one of several robots in communication with computer system 102. For example, computer system 102 may be configured to provide route generation for several robots within a warehouse. The robots and computer system 102 may then communicate over a network within the warehouse.

The robot 110 may be configured to follow the route autonomously. The robot 110 may be configured to use the route to find the corresponding locations of the guide points of the route within the space represented by map 104. For example, the robot 110 may use the route to find a next guide point and then examine its environment to determine if the guide point is visible. The robot 110 can be an automated guided vehicle (AGV), robotic pallet carrier, drone, or other similar vehicle, with various drives (e.g., electric motors, engines, etc.) and mechanisms for motion (e.g., wheeled, flight, ambulatory, etc.). The robot 110 can receive information about its environment through one or more sensors, including radar, LIDAR, infrared sensors, cameras and/or optical sensors and computer vision systems, bump/contact sensors, and the like. The robot 110 can have an on-board computer system configured to perform operations using the sensor information (e.g., compute position, distance to guide points, proximity to obstacles, etc.) and autonomously control the drive system (e.g., move along a route, move to avoid unexpected obstacles, etc.). The robot's 110 computer system may be configured to perform some, any, or all of the operations described for computer system 102, including receiving a graph and generating a route using the graph.

Figure 2:
FIG. 2 is a diagram illustrating a graph through a space, according to some embodiments.

FIG. 2 is a diagram illustrating a graph through a space 200, according to some embodiments. The space 200 may be an example of the space represented by map 104 of FIG. 1. For example, the space 200 may be the interior of a room in a warehouse. The space 200 may have inaccessible regions 206 and accessible region 207. For example, inaccessible regions 206 may be areas of the floorplan of a warehouse for shelving or other physical obstacles for a robot. In some embodiments, the inaccessible regions 206 may be regions where robots are not permitted (e.g., due to the presence of human personnel) even though no physical obstacle would prevent them from moving into those regions. The accessible region 207 may be the open space of warehouse or other facility through which the robot may maneuver.

The accessible region 207 may be divided (e.g., by computer system 102 of FIG. 1) into multiple triangles (e.g., via triangulation) as depicted in FIG. 2. In some embodiments, other shapes such as polygons may be used to divide the accessible region 207 into smaller regions. The size of the triangles may be controlled by the triangulation algorithm to account for the physical size of the robot and to improve the speed of the triangulation process. For example, each triangle may have a minimum size that guarantees that the robot will be fully contained within the dimensions of the triangle if the robot is located at a point (e.g., the centroid) within the triangle.

The space 200 may include exemplary start point 202 and exemplary end point 204, representing the beginning and end of a desired path for a robot to traverse through the space 200. For example, start point 202 may be a current location of a robot and end point 204 may be a destination for the robot when completing a task. In some embodiments, the triangulation of the map of the space 200 may use the start point 202 and end point 204 when defining the resulting triangles. For example, given start point 202 and end point 204, the triangulation may divide the space 200 into triangles such that start point 202 and end point 204 are at the centroids of respective triangles. In other examples, the triangulation may divide the space 200 into triangles with the start point 202 and end point 204 at vertices of respective triangles, centers of connecting edges of respective triangles, or combinations of these (and/or combinations with centroids of respective triangles). As shown in FIG. 2, start point 202 is at the centroid of triangle G1, while end point 204 is at the centroid of G11.

A graph that connects the start point 202 and the end point 204 may be determined (e.g., by the computer system 102 of FIG. 1). The graph can include one or more triangles of the triangulation of the space 200. For example, path 208 may be one possible path between start point 202 and end point 204 and may result in a graph that includes triangles G1 through G11. Additional, unique paths 210 may be possible in the space 200 and may have corresponding graphs. The graph may be determined based on minimizing the number of triangles along the path. For example, the graph for path 208 includes 11 triangles, while each graph for unique paths 210 includes 14 triangles. Thus, the graph for path 208 may be a preferred graph from a graph search algorithm.

The graph may impose an order to the otherwise unstructured triangulation of the space 200. For example, triangles G1, G2, G3 . . . G11 are each connected sequentially along the path 208 from start point 202 to end point 204. Thus, evaluations with respect to elements of the graph (e.g., triangles, corresponding guide points, etc.) may also have a structure (e.g., sequence) according to the graph.

FIG. 3 is a diagram illustrating a portion of a graph 300 of a space with example guide points (e.g., guide point 302, guide point 306, guide point 308, guide point 312, guide point 314) and convergence radii (e.g., convergence radius 304, convergence radius 310), according to some embodiments. The graph 300 may be an example of the graph described above with respect to FIG. 2.

Each triangle of the graph 300 may be associated with a guide point. Respective guide points may be located at any suitable point of a triangle. For example, guide point 302, guide point 306, and guide point 308 are located at the centroids of their respective triangles, while guide point 312 is located at the center of the connecting edge between one triangle and the subsequent triangle and guide point 301 and guide point 314 are located at a vertex. In some embodiments, a triangle may have more than one corresponding guide point. For example, guide point 301 is located at a vertex and guide point 302 is located at the centroid of the same triangle.

Each guide point of the graph may be associated with a corresponding convergence radius. The convergence radius may be determined by a computer system implementing the techniques described herein (e.g., computer system 102 of FIG. 1). As shown in FIG. 3, guide point 302 has a convergence radius 304, while guide point 308 has a convergence radius 310. Convergence radius 310 is larger than convergence radius 304. In some embodiments, each guide point in the graph may be associated with a discrete set of available convergence radii. For example, guide point 302 may be associated with available convergence radii $\{R_{min}, R_1, R_2 . . . . R_{max}\}$. Determining the radius of a guide point can include selecting one of the discrete set of possible convergence radii (e.g., selecting $R_{min}$ as convergence radius 304). The values of $R_1$, $R_2$, etc. may be predetermined.

In some embodiments, the convergence radius for a guide point may have range between a minimum value and a maximum value. The minimum value may correspond to a default value for the route. For example, the minimum value may be set to 10 cm. In some embodiments, the minimum value may be based on a location error of a robot for which the route is being generated. For example, a robot may have a location error of 5 cm, indicating that the robot's computed location and true location may differ by up to 5 cm. The minimum value may be set to some multiple of the location error (e.g., 15 cm). In other embodiments, the minimum value may be based on a physical dimension of the robot for which the route is being generated, or combination of a physical dimension of the robot and the location error of the robot.

The maximum value may be based on the geometry represented by the corresponding triangle. For example, the triangle corresponding to guide point 308 may be large enough to circumscribe a convergence circle having convergence radius 310. The convergence radius 310 may therefore be a maximum value for the convergence radius of guide point 308. Similarly, for a guide point located on an edge of a triangle (e.g., guide point 312), the dimensions of the connected triangles may establish a maximum convergence radius for the guide point. For example, a guide point at the center of an edge may have a maximum convergence radius corresponding to the minimum distance from the guide point location and another edge of one of the two connected triangles.

Figure 4A:
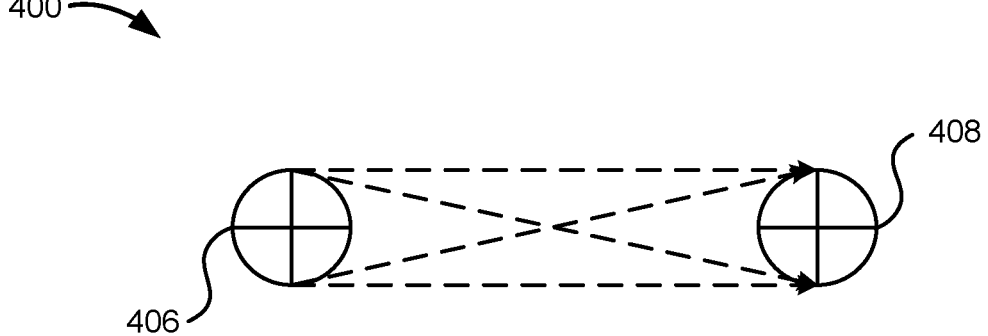
FIG. 4A is a diagram illustrating a complete visibility criterion, according to some embodiments.

FIG. 4A is a diagram illustrating a complete visibility criterion 400, according to some embodiments. A guide point 408 within a graph (e.g., graph 300 of FIG. 3) may satisfy the complete visibility criterion 400 with respect to another guide point 406 if every point on the convergence circle of guide point 408 is "visible" from every point on the convergence circle of guide point 406. Visibility between points on the respective convergence circles may, in some embodiments, correspond to an unobstructed straight-line path between the points. For example, a robot that relies on optical sensors and located at one guide point of a route may be able to completely see a subsequent guide point via a straight, unobstructed path from its sensor (which may be located anywhere in the current guide point) to every point in the subsequent guide point convergence circle.

In some embodiments complete visibility may correspond to unobstructed straight-line path between the four cardinal points (e.g., top, bottom, left, right) of the convergence circle to each of the four cardinal points of the convergence circle of the other guide point. As shown in FIG. 4A, the complete visibility can be represented by the unobstructed dashed arrows from the furthest extent (top and bottom cardinal points) of the convergence circle of guide point 406 to the furthest extent (top and bottom cardinal points) of the convergence circle of guide point 408.

Figure 4B:
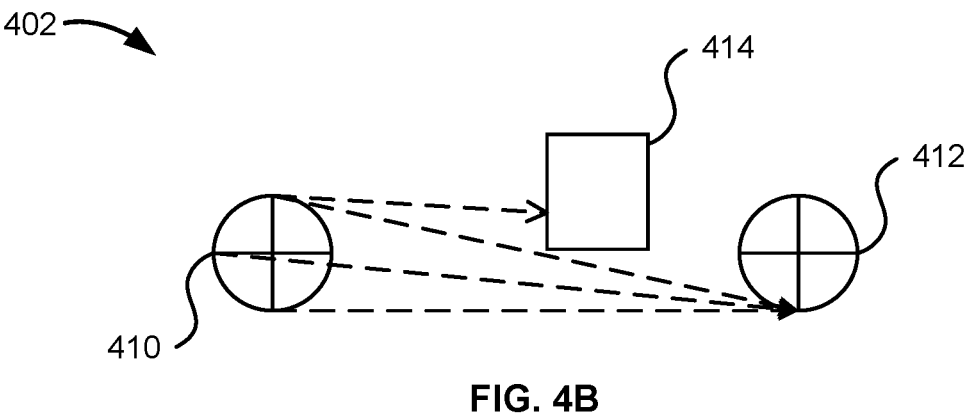
FIG. 4B is a diagram illustrating a partial visibility criterion, according to some embodiments.

FIG. 4B is a diagram illustrating a partial visibility criterion 402, according to some embodiments. A guide point 412 within a graph may satisfy the partial visibility criterion 402 with respect to another guide point 410 if at least one point on the convergence circle of guide point 412 is visible from every point on the convergence circle of guide point 410. As with the complete convergence criterion described above, visibility may correspond to an unobstructed straight-line path between the points, as represented by the dashed arrows. An obstruction 414 may be present in the graph and may correspond to an exterior boundary of the triangles in the graph. For the partial visibility criterion 402, some points on the convergence circle of guide point 412 may not be visible from every point on the convergence circle of guide point 410, as indicated by the dashed arrow that terminates at obstruction 414.

Figure 4C:
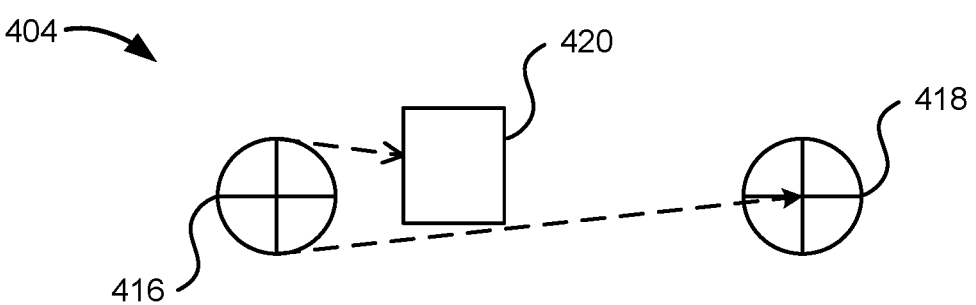
FIG. 4C is a diagram illustrating a center visibility criterion, according to some embodiments.

FIG. 4C is a diagram illustrating a center visibility criterion 404, according to some embodiments. A guide point 418 within a graph may satisfy the center visibility criterion 404 with respect to another guide point 416 if the center of guide point 418 is visible from at least one point on the convergence circle of guide point 416, as represented by the dashed arrow in FIG. 4C. An obstruction 420 may be present in the graph and, like obstruction 414, may correspond to an exterior boundary of the triangles in the graph. For the center visibility criterion 404, the center of guide point 418 may not be visible from many points on the convergence circle of guide point 416, as indicated by the dashed arrow that terminates at obstruction 420.

Obstruction 414 and obstruction 420 may represent an obstacle, wall, or other obstruction within the space that may block a robot's vision (e.g., its sensors) or block a robot's movement through the space. In some embodiments, obstruction 414 may represent a non-physical obstruction within the space such that a robot may be able to see a subsequent guide point from a current guide point in the space but may be prevented from traveling directly to the visible guide point. For example, the obstruction 414 may represent the boundary of a region in the space in which the robot is not permitted to travel. Because the robot may not be able to navigate directly to the guide point, the guide point may be said to satisfy the partial visibility criterion 402 or the center visibility criterion 404 but fail the complete visibility criterion 400.

In some embodiments, one or more of the visibility criteria described above may be used in the techniques herein when generating a route. In some instances, some guide points may be evaluated according to one visibility criterion while other guide points may be evaluated by one or more of the other visibility criteria. The resulting route may include guide points evaluated using combinations of all three visibility criteria, according to certain embodiments.

FIG. 5 is a diagram illustrating a technique for determining guide points C1-C8 of a route through a graph 500 from a start point 502 to an end point 504, according to some embodiments. The graph 500 may be an example of other graphs described herein, including graph 300 of FIG. 3. Operations for determining the guide points may be performed by a computer system described herein, including, for example, computer system 102 and robot 110 of FIG. 1. The guide points C1-C8 may have a sequence characterized by the graph 500, with ascending numerals of the guide points corresponding to triangles further along the path represented by graph 500. As depicted in FIG. 5, each of the guide points C1-C8 are located at the centroids of their respective triangles. In other examples, some, any, or all of the guide points C1-C8 may be located at other positions within their respective triangles, including the centers of edges and vertices of the triangles.

Beginning at start point 502, the computer system can designate start point 502 as the current guide point, including determining a convergence radius for start point 502. The computer system can then determine a convergence radius for or the subsequent guide point C1. The computer system can then evaluate a visibility criterion (e.g., complete visibility criterion 400 of FIG. 4A, partial visibility criterion 402 of FIG. 4B, center visibility criterion 404 of FIG. 4C) for C1. For the purpose of illustration, the visibility criterion shown used in FIG. 5 is the complete visibility criterion. As shown, guide point C1 satisfies (e.g., "passes") the visibility criterion, as indicated by the dashed arrows.

The computer system can then determine a convergence radius for C2 and evaluate a visibility criterion for C2. As shown, guide point C2 also satisfies the visibility criterion. The computer system can then then determine a convergence radius for C3 and evaluate a visibility criterion for C3. Guide point C3, however, fails the visibility criterion, as indicated by obstructed arrow 506, which intersects with an exterior boundary of the graph 500.

Because C3 fails the visibility criterion, the computer system may select the immediately prior guide point that passed the visibility criterion from the current guide point (the start point 502) and add the immediately prior guide point to the route. Since C2 passed the visibility criterion, C2 can be added to the route. After this first iteration, the route includes start point 502 and guide point C2 (and their respective convergence radii). The computer system may designate C2 as the current guide point and perform additional iterations.

FIG. 6 is a diagram illustrating additional techniques for determining guide points of a route through a graph 600, according to some embodiments. The graph 600 may be similar to the graph 500 during further iterations of the technique described above with respect to FIG. 5, with the route corresponding to a path from start point 502 to end point 504.

C2 may be designated the current guide point. The computer system may determine convergence radii and evaluate a visibility criterion between C2 and each of guide points C3-C8. For clarity of the figure, guide points C3-C7 satisfy the visibility criterion from C2 but do not have corresponding arrows indicating this result. Guide point C8 satisfies the visibility criterion as indicated by the dashed arrows. The computer system may then determine a convergence radius for end point 504 and evaluate a visibility criterion between C2 and end point 504. As indicated by the dashed arrow 602 intersecting an obstruction, end point 504 fails the visibility criterion. The computer system may then select guide point C8, the immediately preceding guide point that passed the visibility criterion, and add it to the route. The route may then include start point 502, guide point C2, and guide point C8 (and their respective convergence radii).

FIG. 7 is a diagram illustrating a complete route 706 through a graph 700 with multiple guide points, according to some embodiments. As with FIG. 6 above, the graph 700 may be similar to the graph 500 during further iterations of the technique described above with respect to FIGS. 5 and 6, with the route corresponding to a path from start point 502 to end point 504.

With guide point C8 designated as the current guide point, the computer system may next determine a convergence radius for end point 504. The computer system may then evaluate a visibility criterion for end point 504 from guide point C8. End point 504 can then be added to the route 706. The route 706 can finally include start point 502, guide point C2, guide point C8, and end point 504 and corresponding convergence radii. The route 706 can include fewer guide points than the number of regions (e.g., triangles) in the graph 700.

A robot (e.g., robot 110 of FIG. 1) can use the route to navigate the corresponding path through the space. For example, the computer system may send the route 706 (e.g., represented as a data object) to the robot, with the robot beginning at start point 502. The robot can then navigate autonomously to guide point C2. Once at guide point C2, the robot can determine its position to be within the convergence circle of guide point C2 and then locate the next guide point C8, which can be visible from guide point C2 according to the technique described above. The robot can then navigate to guide point C8 and subsequently to end point 504, completing the path.

In some instances, the route can be supplemented with additional guide points to break up especially long segments. For example, for the route 706, the distance between C2 and C8 may exceed a threshold distance (e.g., 200 m). If the distance between connected guide points in the route exceeds the threshold distance, the computer system can add a supplemental guide point at a point along the straight-line path between the connected guide points. For example, the computer system may add a supplemental guide point at the mid-point between C2 and C8 on route 706. The supplemental guide point may not change the path defined by the route, but can provide an additional point at which a robot can evaluate its location along the route 706 to improve the likelihood that the robot successfully navigates the route 706.

FIG. 8 is diagram illustrating a technique for adding supplemental guide points S0 and S3 to regions of a graph 800, according to some embodiments. The graph 800 may be similar to other graphs described herein, including graph 300 of FIG. 3. The graph 800 illustrates situations in the technique for adding supplemental guide points may be used to generate a route. The additional technique may be used in conjunction with other techniques described herein.

Graph 800 depicts two scenarios for which supplemental guide points may be added. In some embodiments, a graph search algorithm may result in a graph between a start point 802 and an end point 804 for which the first guide point C1 may not satisfy a visibility criterion from start point 802, and for which the final guide point C2 may not satisfy a visibility criterion from end point 804.

If the technique described above with respect to FIG. 5 were applied to graph 800, the computer system may not generate a complete route, since the first guide point C1 fails the visibility criterion (as indicated by dashed arrow 806 intersecting an obstruction) and no prior guide point passes the visibility criterion. In this case, in response to the first guide point C1 failing the visibility criterion, the computer system may add supplemental guide point S0 to the graph in the first region of the graph. As depicted in FIG. 8, supplemental guide point S0 can be located at the centroid of the first region. As with other guide points, supplemental guide point S0 may be located at any other suitable point of the first region so that the supplemental guide point S0 satisfies the visibility criterion from start point 802.

Similarly, the computer system may not generate a complete route since the end point 804 may not satisfy a visibility criterion from the final guide point C2, as indicated by dashed arrow 808 intersecting an obstruction. In this case, in response to the end point 804 failing the visibility criterion from the final guide point C2, the computer system may add supplemental guide point S3 to the graph in the final region of the graph. The computer system may then determine a convergence radius for S3 and evaluate a visibility criterion from guide point C2 to S3. As with S0, S3 may be added at any suitable point within the final region of graph 800. In some embodiments, adding supplemental guide points may also be used in conjunction with the techniques described below with respect to FIGS. 9-10.

Figure 9:
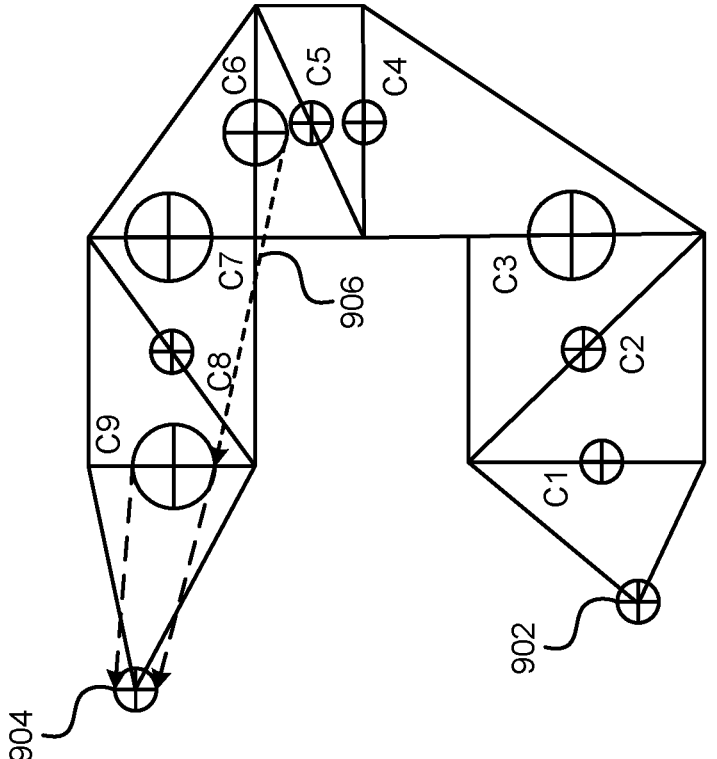
FIG. 9 is a diagram illustrating a technique for determining guide points of a route through a graph from an end point to a start point, according to some embodiments

FIG. 9 is a diagram illustrating a technique for determining guide points of a route through a graph 900 from an end point 904 to a start point 902, according to some embodiments. The graph 900 may be an example of other graphs described herein, including graph 300 of FIG. 3. Operations for determining the guide points may be performed by a computer system described herein, including, for example, computer system 102 and robot 110 of FIG. 1. The guide points C1-C9 may have a sequence characterized by the graph 900, with ascending numerals of the guide points corresponding to triangles further along the path represented by graph 900. In contrast to the technique described above with respect to FIGS. 5-7 (e.g., determining guide points moving "forward" along the graph), the technique of FIGS. 9-10 determines guide points of a route moving "backward" along the graph 900. The route generated by this technique may still be used by a robot to navigate from the start point 902 to the end point 904.

As depicted in FIG. 9, each of the guide points C1-C9 are located at the centers of the connecting edges of their respective triangles. In other examples, some, any, or all of the guide points C1-C9 may be located at other positions within their respective triangles, including the centroids and/or vertices of the triangles.

Beginning at end point 904, the computer system can designate end point 904 as the current guide point. The computer system can then determine a convergence radius for the final guide point C9 in the graph 900 and evaluate a visibility criterion (e.g., complete visibility criterion 400 of FIG. 4A, partial visibility criterion 402 of FIG. 4B, center visibility criterion 404 of FIG. 4C) for the end point 904 from C9. For the purpose of illustration, the visibility criterion shown used in FIG. 5 is the complete visibility criterion.

Since C9 passes the visibility criterion, the computer system can proceed to determine convergence radii and evaluate visibility criteria for preceding guide points C8, C7, and C6. As indicated by dashed arrow 906 intersecting an obstruction, C6 may fail the visibility criterion. The computer system may then add the immediately preceding guide point C7 to the route and designate C7 as the current guide point. The computer system may then iterate the above process to generate a complete route.

FIG. 10 is another diagram illustrating a complete route 1006 with multiple guide points having different convergence radii, according to some embodiments. The graph 1000 may be an example of graph 900 after subsequent iterations of the route planning method. The route 1006 may include start point 902, guide point C3, guide point C4, guide point C7, guide point C9, and end point 904, as well as the respective convergence radii. Similarly to FIG. 7, a robot (e.g., robot 110 of FIG. 1) may use the route 1006 to navigate from the start point 902 to the end point 904 in the space represented by graph 1000.

Figure 11:
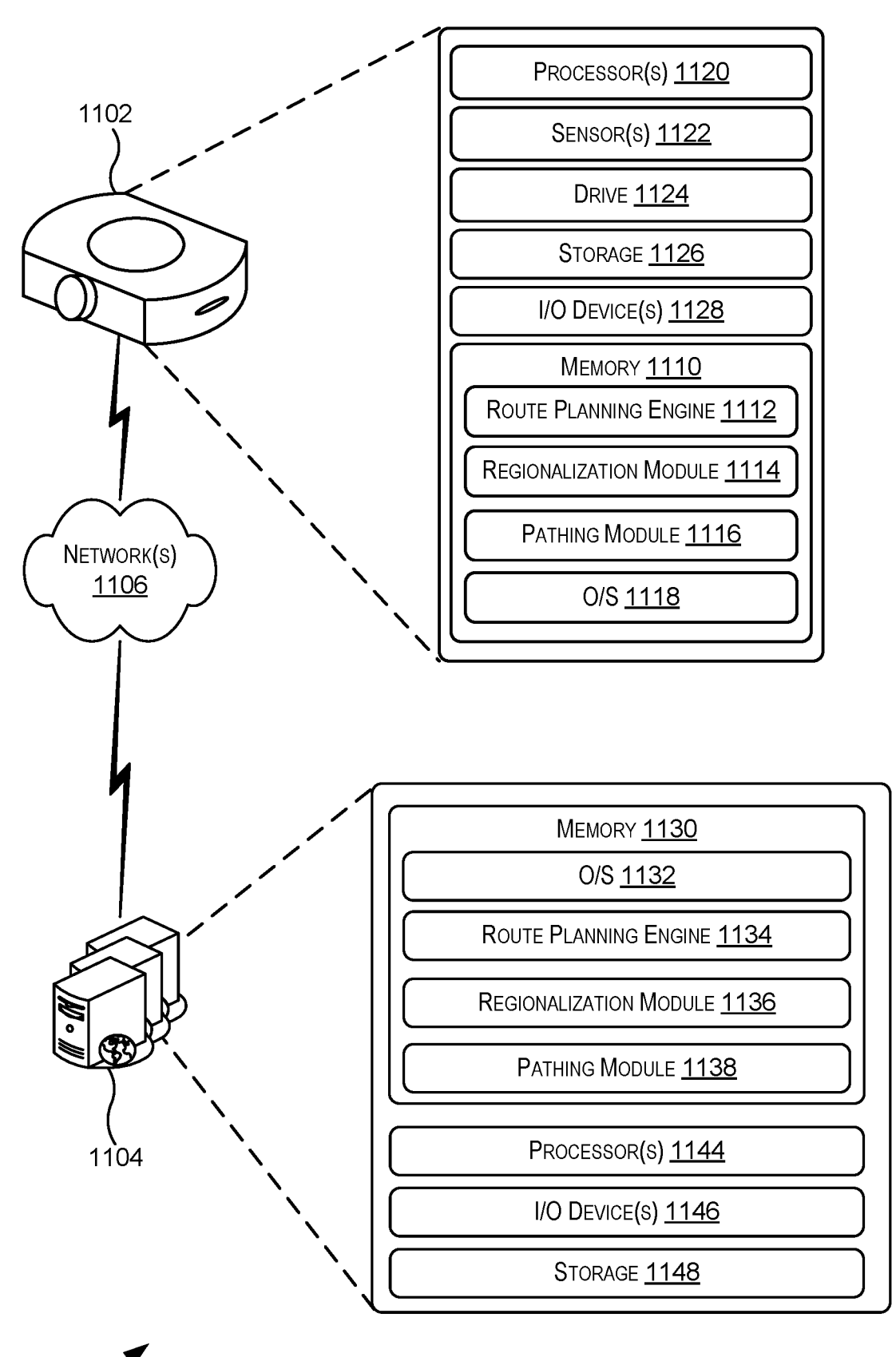
FIG. 11 is a block diagram of an example architecture of a computer system, including a plurality of modules that may perform functions in accordance with at least one embodiment.

FIG. 11 is a block diagram of an example architecture of a computer system 1100, including a plurality of modules that may perform functions in accordance with at least one embodiment. The computer system 1100 can include a server device 1104, a robotic system 1102, and one or more network(s) 1106. The server device 1104 may be an example of computer system 102 of FIG. 1, while robotic system 1102 may be an example of robot 110 of FIG. 1. The computer system 1100 may include more than one computing devices, including cloud devices, and may host a route planning engine 1134. The network(s) 1106 may include any one or a combination of many different types of networks, such as cable networks, the Internet, wireless networks, cellular networks, and other private and/or public networks.

The server device 1104 can have at least one memory 1130, one or more processing units (or processor(s)) 1144, and one or more input/output ("I/O") device(s) 1146. The processor(s) 1144 may be implemented as appropriate in hardware, computer-executable instructions, firmware or combinations thereof. Computer-executable instruction or firmware implementations of the processor(s) 1144 may include computer-executable or machine executable instructions written in any suitable programming language to perform the various functions described. The I/O device(s) 1146 can include displays, monitors, touch screens, mouse, keyboard, or other I/O device.

The memory 1130 may store program instructions that are loadable and executable on the processor(s) 1144, as well as data generated during the execution of these programs, including maps (e.g., GML files, IndoorGML files, or other similar data files or data objects), triangulations, regionalizations, and/or other similar unstructured grids or unstructured fields, graphs (e.g., structured data for connecting portions of the triangulations), routes (e.g., sets of guide points and corresponding convergence radii), and the like. Depending on the configuration and type of server device 1104, the memory 1130 may be volatile (such as random access memory ("RAM")) or non-volatile (such as read-only memory ("ROM"), flash memory, etc.). In some implementations, the memory 1130 may include multiple different types of memory, such as static random access memory ("SRAM"), dynamic random access memory ("DRAM") or ROM. The server device 1104 may also include additional storage 1148, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 1148 may be utilized to store data contents received from one or more other devices. For example, the storage 1148 may store maps, regionalizations, graphs, and/or routes for one or more facilities for which the server device 1104 can generate routes.

The memory 1130 may include an operating system (O/S) 1132 and one or more application programs, modules, or services for implementing the features disclosed herein, including a route planning engine 1134, regionalization module 1136, and pathing module 1138. The route planning engine 1134 may be configured to take a graph as input, identify a start point and end point within the graph, and generate a route through the graph from the start point to the end point. The route planning engine 1134 may also be configured to determine a convergence radius for each guide point in a graph and evaluate a visibility criterion between the guide point and another guide point in the graph.

In some embodiments, the route planning engine 1134 may be configured to generate a route beginning from the end point and evaluating guide points in the graph toward the start point. The route planning engine 1134 may also be configured to add one or more supplemental guide points to an existing graph to generate the route.

In some embodiments, the regionalization module 1136 may be configured to take a map as input and generate a regionalization of the map. The regionalization may be a triangulation, tessellation, or other similar covering or division of the map into smaller regions. The regions may be triangles, polygons, polyhedral, or other polytopes usable to form an unstructured field for the map. In some embodiments, the regionalization module 1136 may also take as inputs a start point and end point within the space. The start point and end point may be specified by additional input received by the server device 1104 (e.g., from a location indication from the robot 1102) or may be identified by the route planning engine 1134. The generated regionalization may be based on the start point and end point. For example, the regionalization may enforce that the input start point and end point are located at vertices of corresponding regions (e.g., triangles).

In some embodiments, the pathing module 1138 may be configured to take a regionalization as input and generate one or more graphs. The graphs can include a set of points of the regionalization corresponding to the regions of the regionalization. The points in the graph may be ordered to form a connection between the corresponding regions. For example, a graph can include points for a sequence of regions that connect a start point to an end point. The planning module 1138 may determine a preferred graph. The preferred graph may be characterized by a minimum number of points (e.g., minimum number of regions) between a start point and end point compared to other possible graphs for the regionalization.

Turning now to the robotic system 1102 in more detail, the robotic system 1102 can be vehicle configured for autonomous or semi-autonomous navigation within a space. For example, the robotic system may be an AGV, an unmanned aerial vehicle (UAV), a drone, or other robot. The robotic system can include an on-board computing system having a memory 1110, one or more processor(s) 1120, I/O device(s) 1128, and at least one storage device 1126. The robotic system can also include one or more sensor(s) 1122 and a drive 1124. The I/O device(s) 1128 can include a transmitter and receiver for sending/receiving data to and from the server device 1104.

The sensor(s) 1122 can include any suitable number and type of sensor (and corresponding emitters) for assisting the robotic system 1102 to maneuver autonomously or semi-autonomously. For example, sensor(s) 1122 can include radar sensors, LIDAR sensors, cameras, infrared sensors, tactile sensors, bump sensors, optical sensors and the like. The robotic system 1102 can use the sensor(s) 1122 to determine if a location in a space corresponding to a guide point of a route is visible. The drive 1124 can include any suitable system for producing the robotic system's 1102 motion, including, for example, electric motors, engines, wheeled drive systems, propeller flight systems, ambulatory (walking) systems, and the like.

As with processor(s) 1144 of server device 1104, the processor(s) 1120 may be implemented as appropriate in hardware, computer-executable instructions, software, firmware, or combinations thereof. Computer-executable instruction, software, or firmware implementations of the processor(s) 1120 may include computer-executable or machine-executable instructions written in any suitable programming language to perform the various functions described. The memory 1110 may store program instructions that are loadable and executable on the processor(s) 1144, as well as data generated during the execution of these programs. Depending on the configuration and type of memory included in the robotic system 1102, the memory 1110 may be volatile (such as RAM) and/or non-volatile (such as read-only memory ("ROM"), flash memory, or other memory).

The memory 1110 may include an operating system (O/S) 1118 and one or more application programs, modules, or services for implementing the features disclosed herein, including route planning engine 1112, regionalization module 1114, and pathing module 1116. Like their similarly named counterparts implemented in server device 1104, the route planning engine 1112, regionalization module 1114, and pathing module 1116 may be configured to perform one or more operations for generating a regionalization from a map, generating a graph from the regionalization, and generating a route from the graph. Some, any, all, or various combinations of the operations described above with respect to server device 1104 may instead be performed by the robotic system 1102. For example, the robotic system 1102 may receive a map (e.g., a map stored by storage 1148 of the server device 1104), generate a triangulation from the map using regionalization module 1114, generate a graph between a current location of the robotic system 1102 and a destination point, and then generate a route from the graph in accordance with the techniques described herein.

In some embodiments, the robotic system 1102 may execute a route. Executing the route can include navigating from one guide point to the next in accordance with a sequence defined by the graph used to generate the route. Navigating to a guide point can include identifying a location in the space corresponding to the guide point and using the drive 1124 and sensor(s) 1122 to move the robotic system to the location. The sensor(s) 1122 may be used to verify the location of the robotic system 1102 with a location corresponding to the guide point to within a location error of the robotic system 1102.

In some embodiments, the robotic system 1102 may not successfully execute a route. For example, an object may be present in the space that is not present in the map used to generate the route. When the robotic system 1102 encounters the object, it may attempt to maneuver around the object according to autonomous logic. In doing so, the location of the next guide point may no longer be visible from the location of the robotic system 1102. The robotic system 1102 may send an indication to server device 1104 that the route cannot be executed. In response, the server device 1104 can generate an updated route using the current location of the robotic system 1102 as a new start point. The updated route can then be sent to the robotic system 1102. In some embodiments, the robotic system 1102 can generate its own updated route using route planning engine 1112.

FIG. 12 is a simplified flow diagram of an example process 1200 for generating a route through a graph, according to some embodiments. The process may be performed by one or more components of computer systems described herein, including server device 1104 and route planning engine 1134, regionalization module 1136, and pathing module 1138 of FIG. 11. The process 1200 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some or all of the process 1200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1200 can begin at block 1202 with a server device receiving a graph characterizing regions of a map of a space. The graph can include points that can form an ordered connection (e.g., a sequence) of regions of the map. The points can each correspond to a respective region of the map. In some embodiments, the regions may be determined by a regionalization process using the map. For example, the regionalization may be a triangulation using Delaunay's algorithm.

At block 1204, the server device can determine a start point and an end point of the points in the graph. The start point and end point can be connected by a portion of the graph that includes a subset of the points (e.g., a subset of guide points).

The server device can use the portion of the graph to generate a route between the start point and the end point. To generate the route, the server device can designate a current guide point, at block 1206. The initial current guide point may be the start point. In some embodiments, the initial current guide point may be the end point.

At block 1208, the server device can determine a convergence radius for the points in the subset. In some embodiments, the server device can determine a convergence radius for a point that is being evaluated. In some embodiments, the server device can determine the convergence radii of all points in the subset (e.g., if all the convergence radii are set to a default value).

At block 1210, the server device can evaluate a visibility criterion between the current guide point and the points in the subset of points. For example, the server device can evaluate the visibility of a convergence circle of a subsequent point from the current guide point. The server device can evaluate the visibility criterion for each successive point until a subsequent point fails the visibility criterion. Responsive to an evaluation that the subsequent point fails the visibility criterion, the server device can designate an additional point that passed the visibility criterion as the current guide point, at block 1212. In some embodiments, the additional point may be the immediately preceding point evaluated.

At block 1214, the server device can add the current guide point to the route. In some embodiments, at block 1216 the server device can iterate on the operations in blocks 1208-1216 until both the start point and the end point are in the route.

Figure 13:
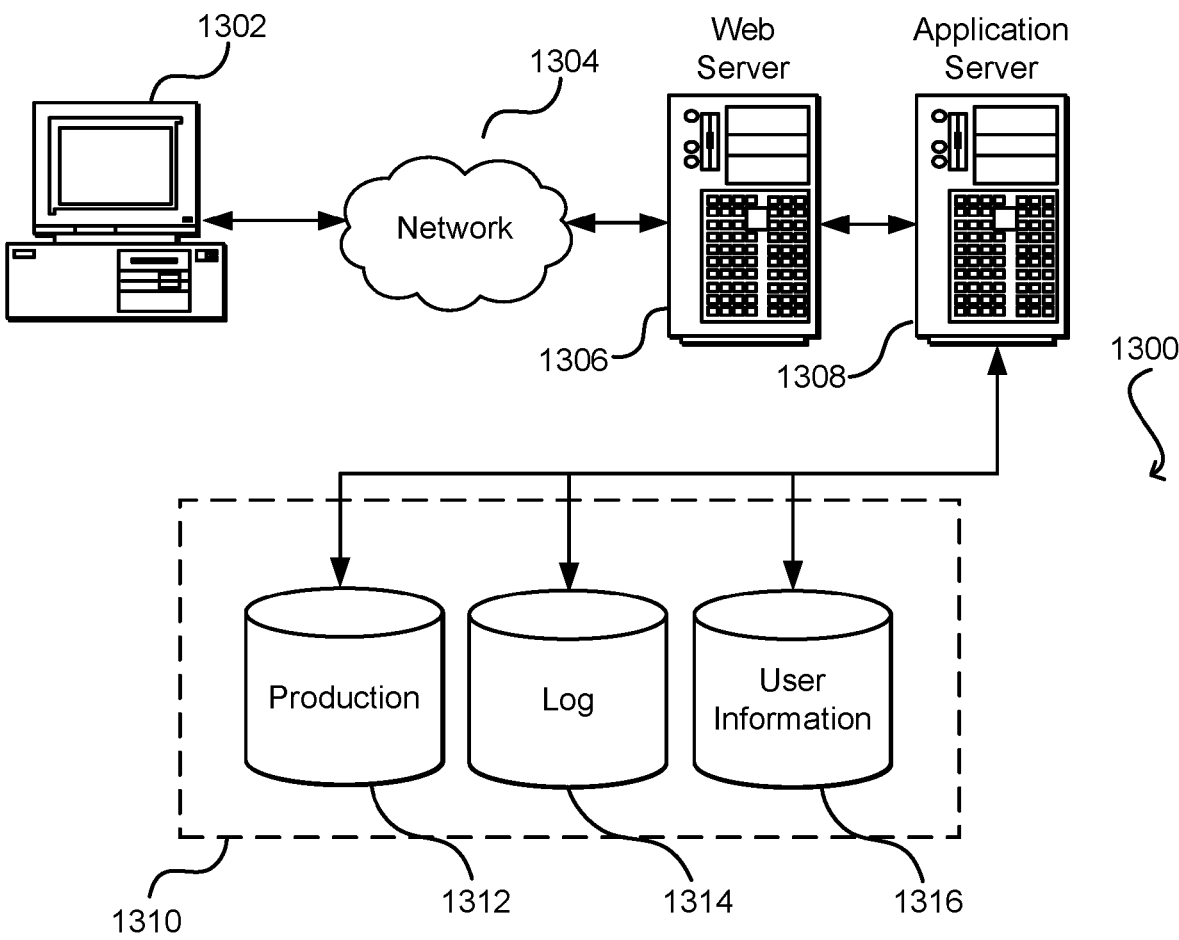
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infra-red network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at a server device, a graph comprising points of an ordered connection of regions of a map of a space, each point corresponding to a respective region of the regions;
   determining, by the server device, a start point and an end point of the points in the graph, the start point and end point connected by at least a portion of the graph comprising a subset of the points;
   generating, by the server device, a route between the start point and the end point by:
   (a) designating a current guide point;
   (b) determining a convergence radius for each point of the subset of the points, the convergence radius representing a non-zero distance from each point and based on a characteristic of a computer-guided vehicle;

(c) evaluating, based at least in part on the convergence radii determined for each point of the subset of the points, a visibility criterion between the current guide point and the points in the subset of the points by determining whether at least one point of a convergence circle centered at a point of the subset of the points is visible from each point of an additional convergence circle centered at the current guide point;

(d) responsive to an evaluation that a subsequent point fails the visibility criterion, designating an additional point that passed the visibility criterion as the current guide point; and (e) adding the current guide point to the route;

sending, by the server device to the computer-guided vehicle, the route;

receiving, at the server device from the computer-guided vehicle, a current location of the computer-guided vehicle;

generating, by the server device, an updated route by performing operations (a)-(e), wherein the start point corresponds to the current location of the computer-guided vehicle; and sending, by the server device to the computer-guided vehicle, the updated route.

2. The computer-implemented method of claim 1, wherein (a) designating the current guide point comprises designating the start point as the current guide point.

3. The computer-implemented method of claim 1, wherein (c) evaluating a visibility criterion between the current guide point and the points in the subset of the points is performed for each of the points in the subset of the points according to a sequence characterized by the ordered connection of the regions.

4. The computer-implemented method of claim 3, wherein the sequence comprises evaluations from the current guide point to the points in the subset of the points between the current guide point and the end point.

5. The computer-implemented method of claim 1, wherein the regions are triangles.

6. The computer-implemented method of claim 1, wherein generating the updated route comprises generating the updated route in response to receiving, at the server device from the computer-guided vehicle, an indication that the route cannot be followed.

7. The computer-implemented method of claim 1, wherein the convergence circle and the additional convergence circle defined by corresponding convergence radii.

8. The computer-implemented method of claim 1, wherein generating the route further comprises iteratively performing operations (c)-(e) until the end point is in the route.

9. A non-transitory computer-readable storage medium storing computer-executable instructions that, when executed by a processor, cause a computing system to:

receive a graph comprising points of an ordered connection of regions of a map of a space, each point corresponding to a respective region of the regions;

determine a start point and an end point of the points in the graph, the start point and end point connected by at least a portion of the graph comprising a subset of the points;

generate a route between the start point and the end point by:

(a) designating the end point as a current guide point;

(b) determining a convergence radius for each point of the subset, the convergence radius representing a non-zero distance from each point and based on a (i) characteristic of a computer-guided vehicle or (ii) a characteristic of the map of the space;

(c) evaluating, based at least in part on the convergence radii determined for each point of the subset of the points, a visibility criterion between the current guide point and the points in the subset by determining whether each point of a convergence circle centered at a point of the subset of the points is visible from each point of an additional convergence circle centered at the current guide point;

(d) responsive to an evaluation that a subsequent point fails the visibility criterion, designating an additional point that passed the visibility criterion as the current guide point; and (e) adding the current guide point to the route; and causing the computer-guided vehicle to move through the space according to the route.

10. The non-transitory computer-readable medium of claim 9, wherein (c) evaluating a visibility criterion between the current guide point and the points in the subset is performed for each of the points in the subset according to a sequence characterized by the ordered connection of the regions.

11. The non-transitory computer-readable medium of claim 10, wherein the sequence comprises evaluations from the current guide point to the points in the subset between the current guide point and the start point.

12. The non-transitory computer-readable medium of claim 9, wherein the characteristic of the computer-guided vehicle comprises a location error, and wherein the convergence radius is greater than a value corresponding to the location error of the computer-guided vehicle.

13. The non-transitory computer-readable medium of claim 9, wherein the characteristic of the map of the space comprises a maximum dimension of the region corresponding to each point of the subset, and wherein the convergence radius is less than the maximum dimension of the region corresponding to each point in the subset.

14. The non-transitory computer-readable medium of claim 9, wherein the regions are polytopes dividing the space.

15. The non-transitory computer-readable medium of claim 9, wherein the convergence circle and the additional convergence circle defined by corresponding convergence radii.

16. The non-transitory computer-readable medium of claim 9, wherein generating the route further comprises iteratively performing operations (c)-(e) until the end point is in the route.

17. A robotic system, comprising:

a guided vehicle;

a processor of the guided vehicle; and a memory storing computer-readable instructions that, when executed by the processor, cause the robotic system to:

obtain a graph comprising points of an ordered connection of regions of a map of a space, each point corresponding to a respective region of the regions;

determine a start point and an end point of the points in the graph, the start point and the end point connected by at least a portion of the graph comprising a subset of the points;

generate a route between the start point and the end point by:

(a) designating the start point as a current guide point;

(b) determining a convergence radius for each point of the subset of the points in the portion of the graph that is subsequent to the current guide point, the convergence radius representing a non-zero distance from each point and based on a characteristic of the guided vehicle;

(c) evaluating, based at least in part on the convergence radii determined for each point of the subset of the points, a visibility criterion between the current guide point and subsequent points in the subset of the points by determining whether a convergence circle centered at the subsequent point is visible from an additional convergence circle centered at the current guide point, the convergence circle characterized by the convergence radius, the convergence circle and the additional convergence circle defined by corresponding convergence radii;

(d) responsive to an evaluation that a subsequent point fails the visibility criterion, designating a prior point as the current guide point; and (e) adding the current guide point to the route; and
move the guided vehicle through the space according to the route.

18. The robotic system of claim 17, wherein the regions are triangles, and wherein each point corresponds to the centroid of a respective triangle.

19. The robotic system of claim 17, wherein the regions are triangles, and wherein each point corresponds to the center of a connecting edge of a respective triangle.

20. The robotic system of claim 17, wherein generating the route further comprises iteratively performing operations (c)-(e) until the end point is in the route.

* * * * *